(12) United States Patent
Chen

(10) Patent No.: US 11,130,182 B2
(45) Date of Patent: Sep. 28, 2021

(54) REPLACEABLE TOOL HOLDER

(71) Applicant: Hantop Intelligence Technology Co., LTD., Taichung (TW)

(72) Inventor: Jenq-Shyong Chen, Taichung (TW)

(73) Assignee: Hantop Intelligence Technology Co., LTD.

( * ) Notice: Subject to any disclaimer, the term of this patent is extended or adjusted under 35 U.S.C. 154(b) by 0 days.

(21) Appl. No.: 16/718,553

(22) Filed: Dec. 18, 2019

(65) Prior Publication Data
US 2020/0206829 A1 Jul. 2, 2020

(30) Foreign Application Priority Data
Dec. 28, 2018 (TW) .................................. 107147854

(51) Int. Cl.
*B23B 31/02* (2006.01)
*B23Q 1/00* (2006.01)

(52) U.S. Cl.
CPC ............ *B23B 31/02* (2013.01); *B23Q 1/0009* (2013.01); *B23B 2260/108* (2013.01); *B23B 2270/10* (2013.01)

(58) Field of Classification Search
CPC ..... B23B 31/02; B23B 37/00; B23B 2270/10; B23B 29/125; B23B 2260/128;
(Continued)

(56) References Cited

U.S. PATENT DOCUMENTS 4,536,000 A * 8/1985 Rohm .................. B23Q 17/005
 279/126
6,586,862 B1 * 7/2003 Cselle ............... B23B 29/03432
 310/328
(Continued)

FOREIGN PATENT DOCUMENTS

CN 102015203 A 4/2011
CN 202910603 U 5/2013
(Continued)

OTHER PUBLICATIONS

Machine Translation, WO2010091821A1, Aug. 2010. (Year: 2010).*
(Continued)

*Primary Examiner* — Eric A. Gates
*Assistant Examiner* — Chwen-Wei Su
(74) *Attorney, Agent, or Firm* — Tracy M Heims; Apex Juris, pllc.

(57) ABSTRACT

A replaceable tool holder includes a connector adapted to be engaged with and driven to rotate by a spindle, a tool chuck, of which an end is detachably engaged with the connector and another end is adapted to engage a tool, and an electronic component provided in a chamber inside the tool chuck. The connector is provided with a non-contact power transmission device. A passage is provided in the connector and the tool chuck, wherein a wire is disposed in the passage, transmitting electric power to serve the need of the electronic component. With such design, one connector can be used to connect tool chucks of different types or models. Therefore, a user could, as required, replace the connecting interface between the tool holder and the spindle or the connecting interface between the tool holder and the tool. Furthermore, the electronic component could be steadily supplied with electric power.

14 Claims, 20 Drawing Sheets

(58) Field of Classification Search
CPC .............. B23B 2260/108; B23B 31/28; B23B 2270/022; B23Q 1/34; B23Q 1/0009; B23Q 17/0952; Y10T 279/21; Y10T 408/23; Y10S 408/70
See application file for complete search history.

(56) References Cited

U.S. PATENT DOCUMENTS

| | | | | |
|---|---|---|---|---|
| 7,328,519 | B2* | 2/2008 | Harding | B23Q 1/0009 33/559 |
| 8,821,084 | B2* | 9/2014 | Chen | B23B 31/02 409/232 |
| 9,878,377 | B2* | 1/2018 | Short | B23B 31/02 |

FOREIGN PATENT DOCUMENTS

| | | | | |
|---|---|---|---|---|
| CN | 104384575 | A | 3/2015 | |
| CN | 204248513 | U | 4/2015 | |
| CN | 106334806 | A | 1/2017 | |
| CN | 106694932 | A | 5/2017 | |
| DE | 10137055 | A1 * | 2/2003 | ......... B23B 31/1107 |
| JP | 2010194614 | A | 9/2010 | |
| TW | M428011 | U | 5/2012 | |
| TW | M429551 | U | 5/2012 | |
| TW | M555265 | U | 2/2018 | |
| WO | WO-2009101987 | A1 * | 8/2009 | ............... B24B 1/04 |
| WO | WO-2010091821 | A1 * | 8/2010 | ............ B23B 37/00 |

OTHER PUBLICATIONS

Machine Translation, DE 10137055, Sauer, H. Jun. 2006. (Year: 2006).*
Search report for TW107147854, dated Aug. 13, 2019, Total of 1 page.
English abstract for CN102015203, Total of 1 page.
English abstract for CN104384575, Total of 1 page.
English abstract for CN106334806, Total of 1 page.
English abstract for CN106694932, Total of 1 page.
English abstract for CN202910603, Total of 1 page.
English abstract for CN204248513, Total of 1 page.
English abstract for JP2010194614, Total of 1 page.
English abstract for TWM428011, Total of 1 page.
English abstract for TWM429551, Total of 1 page.
English abstract for TWM555265, Total of 1 page.
Search report for CN201910952123.8, dated Dec. 31, 2020, Total of 2 pages.

* cited by examiner

REPLACEABLE TOOL HOLDER

BACKGROUND OF THE INVENTION

1. Technical Field

The present invention relates generally to machining equipment, and more particularly to a replaceable tool holder.

2. Description of Related Art

In the field of machining equipment, the demand for processing hard brittle materials or materials of high tenacity which are difficult for cutting or grinding is increasing as the technology advances rapidly, and the quality and efficiency of processing are now further requested. Therefore, spindle systems which are capable of rotating or vibrating are more and more widely utilized to grind, cut, or bore holes on workpieces by oscillating processing tools at high frequencies. The processing manners mentioned above can shake off microparticles from the surface of a workpiece by high-frequent oscillation, which not only decrease the tiny scraps generated during the processing or from molding materials, reducing the resistance encountered during cutting or chipping and increasing tool life, but also make the processed surface of a workpiece finer, improving the precision and quality of the workpiece.

A spindle system basically includes a spindle, a tool holder, and a tool, wherein the tool holder connects the spindle and the tool, and rotates along with the spindle to transmit the torque to the tool. It can be apparently seen that a tool holder is a critical bridging component connecting the spindle of a tool machine to a tool. There are various types of tool holders, including, if classified by the standards of different countries: BT (Japan), SK, HSK (both German), CAT (USA), etc. Tool holders classified by the standard of each country can be further divided into different specifications and forms. By the taper of the cone-shaped hole on a spindle, tool holders can be divided into 7:24 universal tapers and 1:10 HSK hollow shank tapers. Generally, different tool holders are adapted to be applied to different machine tools, in different processing environments, and for different kinds of objects to be processed. Since tool holders of different types cannot be replaced conveniently and promptly, there is still room for improvement in this field.

BRIEF SUMMARY OF THE INVENTION

In view of the above, the objective of the present invention is to provide a replaceable tool holder, which separates the structural design of a conventionally integrated tool holder into two parts, and therefore the interface which connects the tool holder and the spindle or the interface which connects the tool holder and the tool can be departed and replaced as required.

The present invention provides a replaceable tool holder, including a connector, a tool chuck, and an electronic component. The connector is adapted to be engaged with a spindle, and is drivable to rotate by the spindle, wherein the connector is provided with a first sensing module, which is adapted to receive electric power from an externally provided second sensing module in a wireless manner. The connector has at least a connector passage provided therein, and the at least one connector passage has at least one connector wire provided therein. An end of the at least one connector wire is electrically connected to the first sensing module, whereby to receive electric power from the first sensing module, while another end thereof is electrically connected to a first conductive portion. An end of the tool chuck is detachably engaged with the connector, and another end thereof is adapted to engage a tool, wherein the tool chuck has a chamber and at least one first passage provided therein. The at least one first passage communicates the chamber, and the at least one first passage has at least one first wire provided therein. An end of the at least one first wire is electrically connected to a second conductive portion, which is adapted to electrically connect the first conductive portion. The electronic component is provided in the chamber, wherein the electronic component is electrically connected to the at least one first wire.

With the design described above, the connector used to connect the spindle and the tool chuck used to connect the tool can be separated. In this way, the connecting interface between the tool holder and the spindle (i.e., the connector) and the connecting interface between the tool holder and the tool (i.e., the tool chuck) can be replaced as required. Furthermore, the power transmission device provided on the connector can transmit electric power to the electronic component through the passage and wire inside the connector and the tool chuck, wherein the examples of the electronic component include but not limited to a vibration generator or a sensor.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

A replaceable tool holder 1 of a first embodiment of the present invention, which is illustrated in FIG. 1 to FIG. 6, includes a connector 10, a tool chuck 20, and an electronic component 30.

Figure 1:
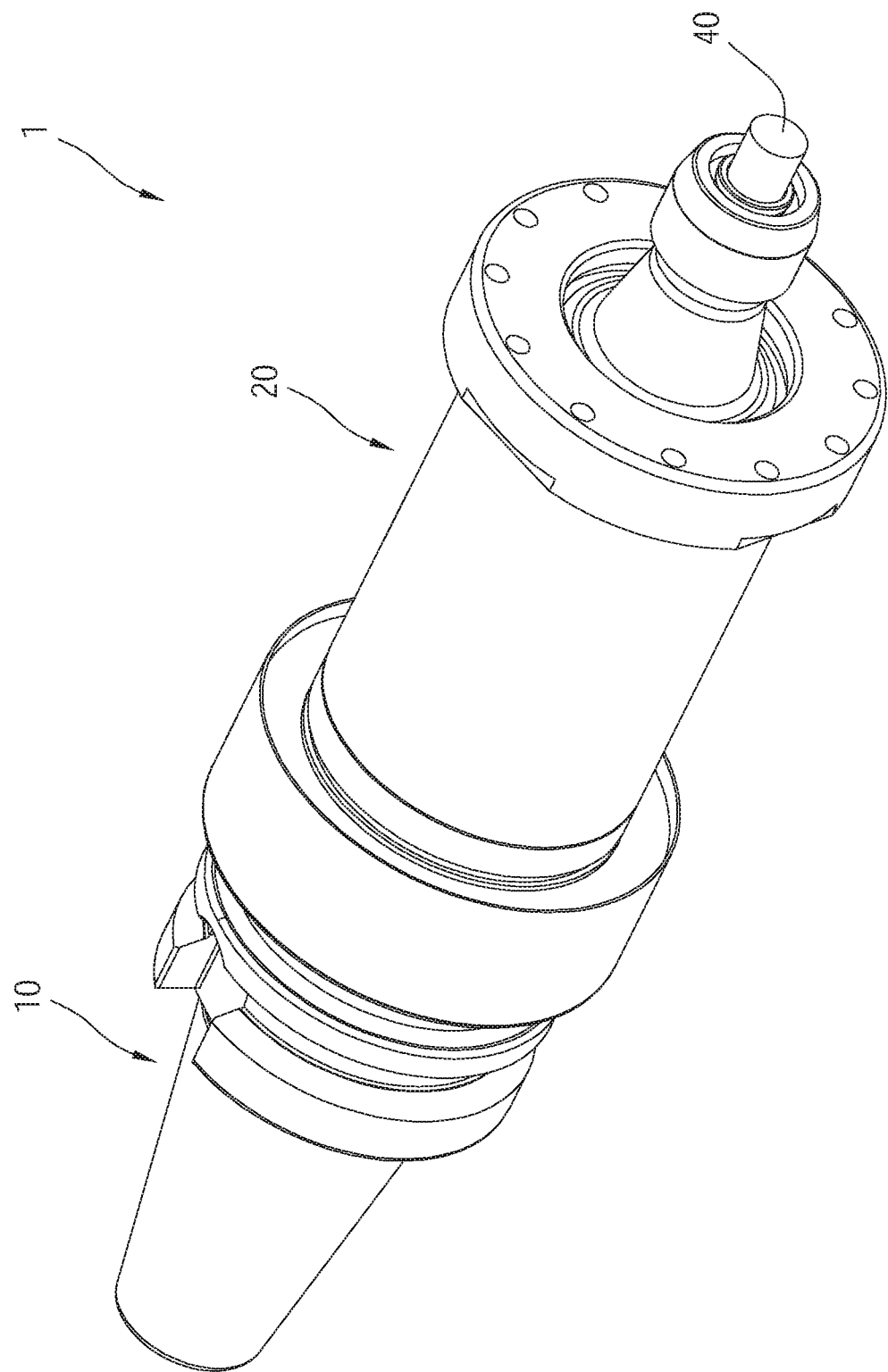
FIG. 1 is a perspective view of the replaceable tool holder of a first embodiment of the present invention.
Figure 2:
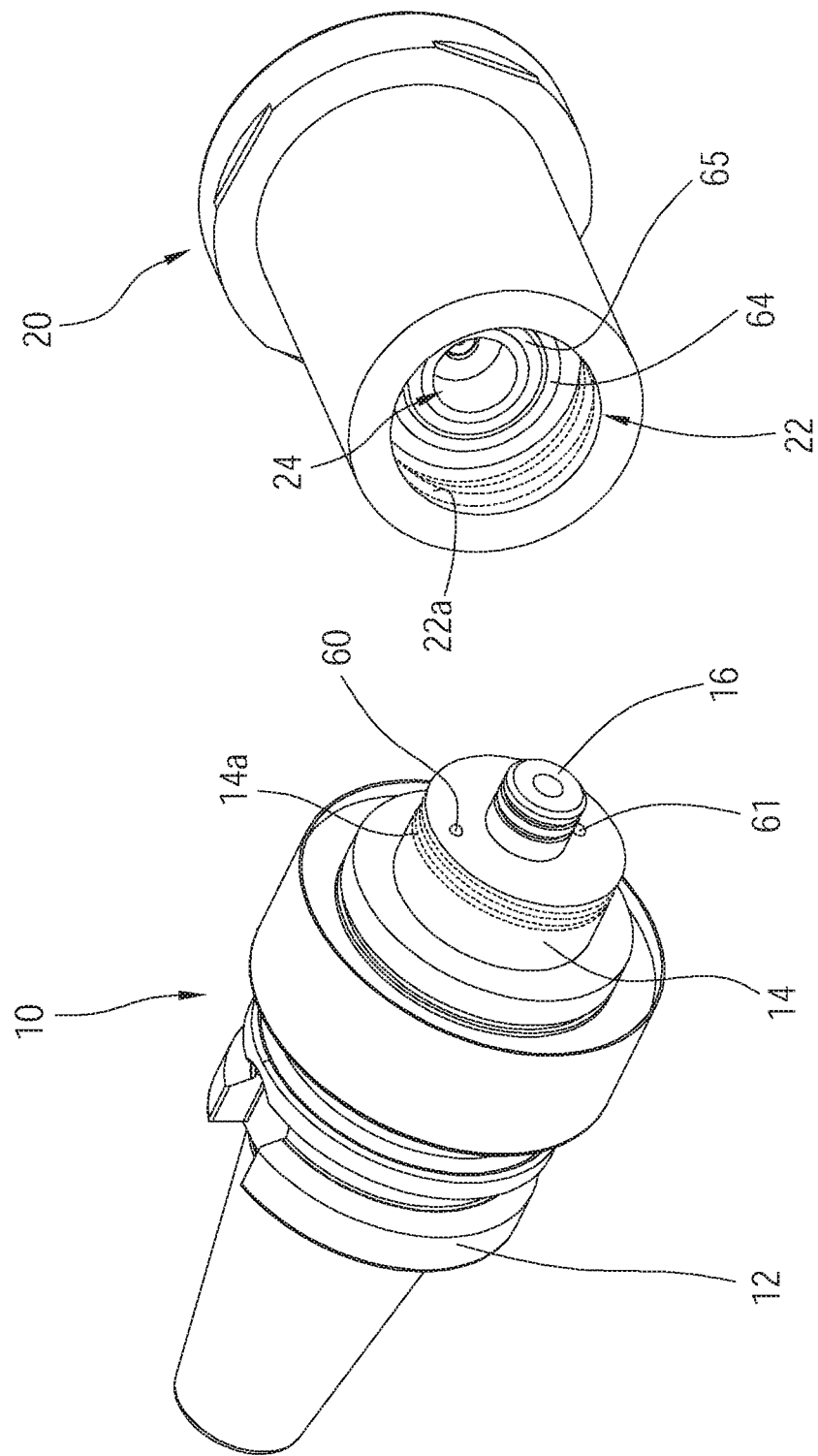
FIG. 2 to FIG. 4 are exploded views of the replaceable tool holder of the first embodiment.

As shown in FIG. 1 and FIG. 2, the connector 10 is adapted to be engaged with a spindle 6, and can be rotatable as being driven by the spindle 6. In the current embodiment, the spindle 6 includes a core shaft 6a and a spindle holder. The core shaft 6a can be driven to rotate relative to the spindle holder 6b, and the core shaft 6a is connected to an end of the connector 10, whereby to drive the connector 10 to rotate.

Figure 3:
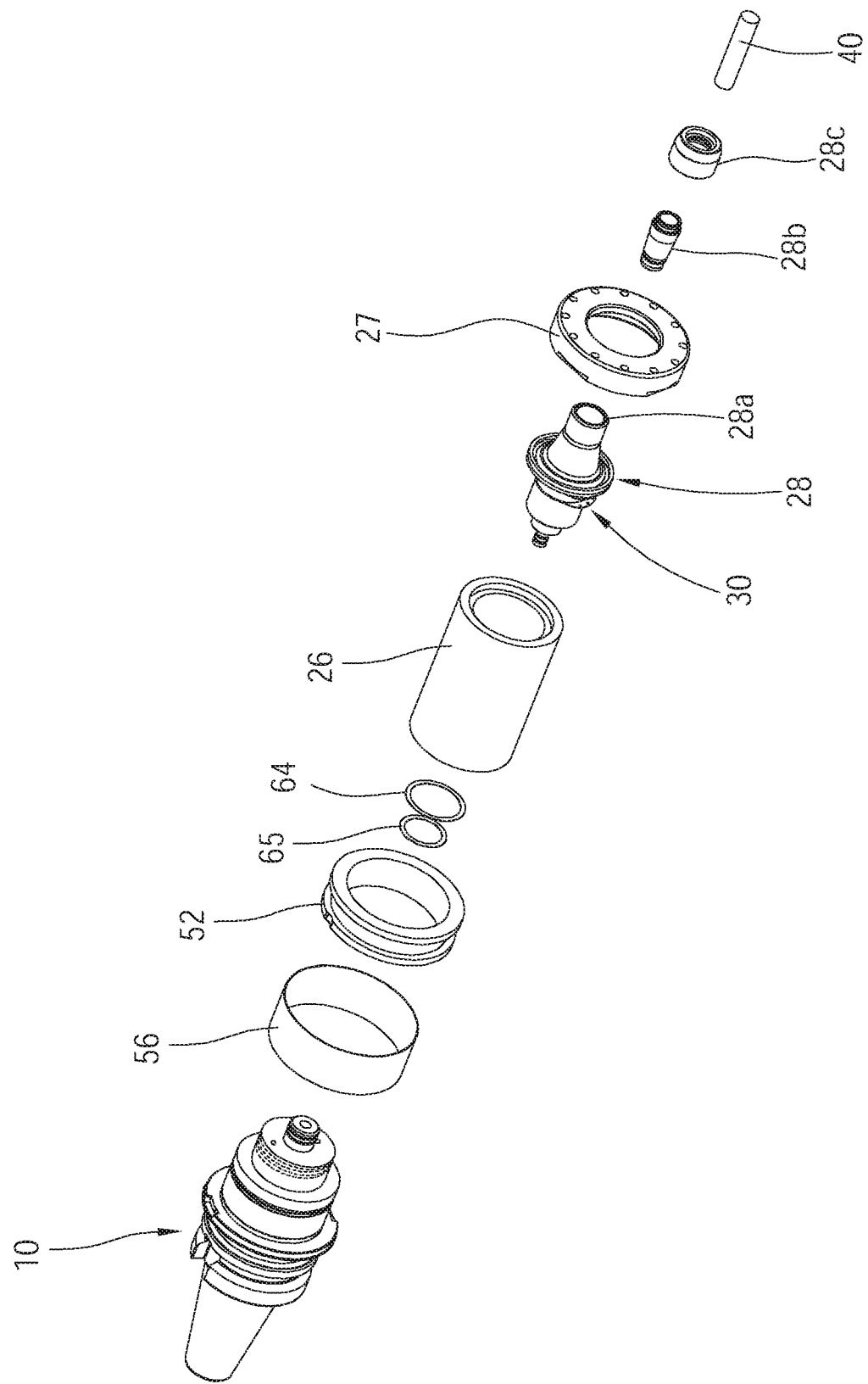
Figure 4:
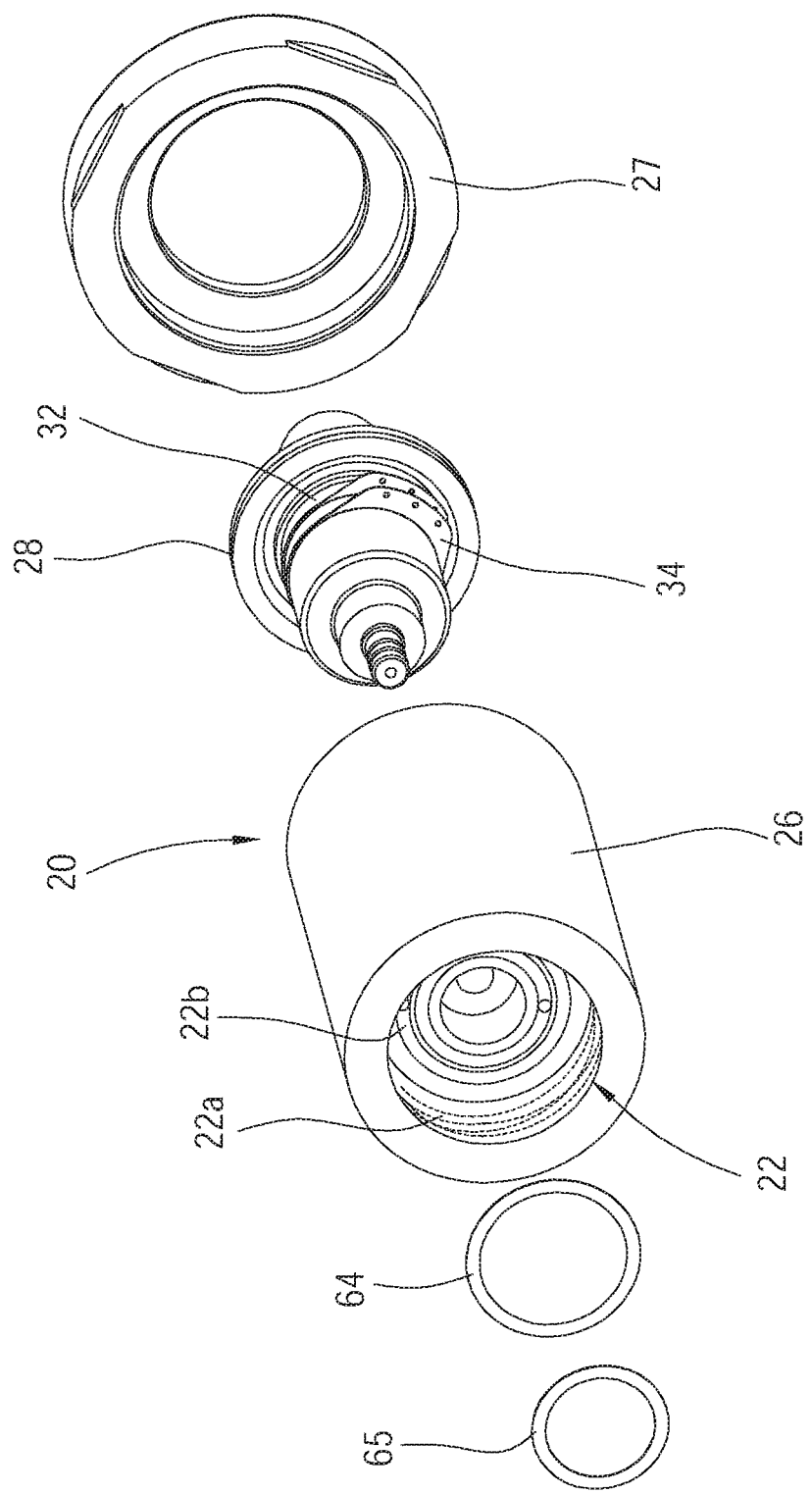
Figure 5:
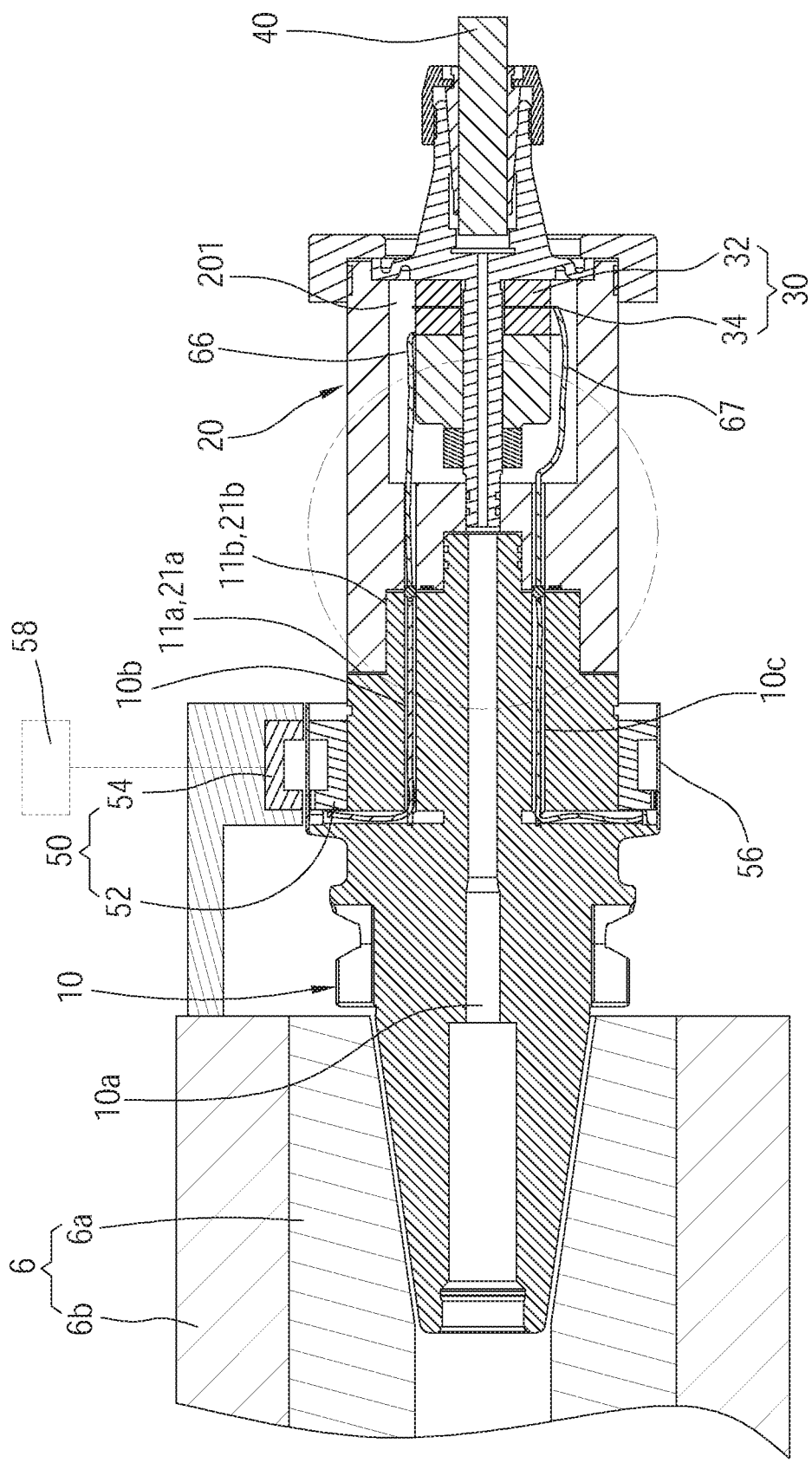
FIG. 5 and FIG. 6 are sectional views of the replaceable tool holder of the first embodiment.

As shown in FIG. 1 to FIG. 3, an end of the tool chuck 20 is detachably engaged with the connector 10, while another end thereof is adapted to engage a tool 40. As shown in FIG. 5, the tool chuck 20 has a chamber 201 provided therein, wherein the chamber 201 is provided with the electronic component 30. The electronic component 30 can be, but not limited to be, a vibration generator, a sensor, etc. In the embodiment that the electronic component 30 is a vibration generator, its function can be realized by containing a vibration component such as a capacitive component or a piezoelectric component. For instance, the electronic component 30 could contain a piece of piezoelectric ceramics, which could be driven to generate high-frequent vibrations by electric power, whereby to directly or indirectly drive the tool 40 to vibrate. In the current embodiment, as shown in FIG. 3 to FIG. 5, the electronic component 30 is a vibration generator, which includes two piezoelectric ceramics pieces 32 and two electrode sheets 34. When the electrode sheets 34 are electrified, the piezoelectric ceramics pieces 32 are triggered to generate high-frequent vibrations. In alternative implementations, said electronic component 30 is not limited to the aforementioned example. In addition, in yet another embodiment, said electronic component 30 could be, but not limited to be, a strain gauge, an accelerometer, a temperature sensor, etc., which could detect certain kinds of values while the tool holder is operating, and could further send out those values to an external receiver.

As shown in FIG. 2 to FIG. 4, in the current embodiment, said connector 10 has a seat 12 and a first column 14, wherein an end of the seat 12 is adapted to be engaged with the spindle to be driven by it. The first column 14 protrudes from another end of the seat 12, and the first column 14 has a first engaging segment 14a, In the current embodiment, said first engaging segment 14a is, but not limited to be, a threaded segment. Furthermore, in the current embodiment, the first column 14 further has a second column 16 protruding from an end surface thereof.

In addition, as shown in FIG. 3 and FIG. 5, said connector 10 is further provided with a power transmission device 50, which includes a first sensing module 52 and a second sensing module 54. The first sensing module 52 is disposed on an outer circumferential surface of the connector 10. The second sensing module 54 is fixed at a position out of the tool holder. For example, the second sensing module 54 can be supported by a support 55, which can be fixed at the spindle holder 6b of the spindle 6. Furthermore, the second sensing module 54 is electrically connected to a power supply 58, whereby the second sensing module 54 could receive the electric power of the power supply 58, and then transmit the electric power to serve the need of the first sensing module 52. In the current embodiment, the first sensing module 52 receives the electric power from the second sensing module 54 in a wireless manner, i.e., through non-contact electromagnetic induction. In addition, a restraint ring 56 is provided between the first sensing module 52 and the second sensing module 54, wherein the restraint ring 56 fits around a periphery of the first sensing module 52 to provide a suitable restraint force to the first sensing module 52, whereby the first sensing module 52 could withstand the centrifugal force generated while rotating.

Figure 6:
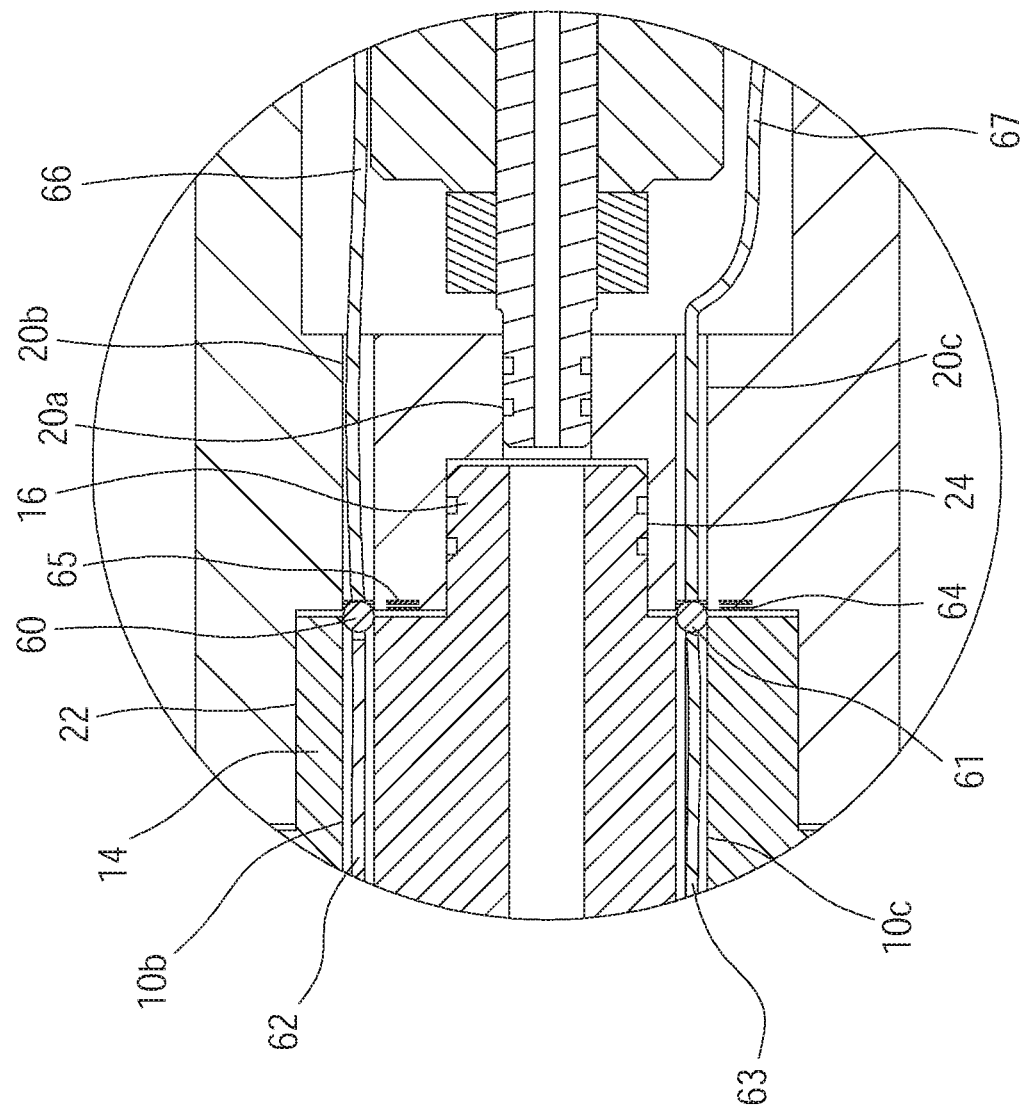
Figure 7:
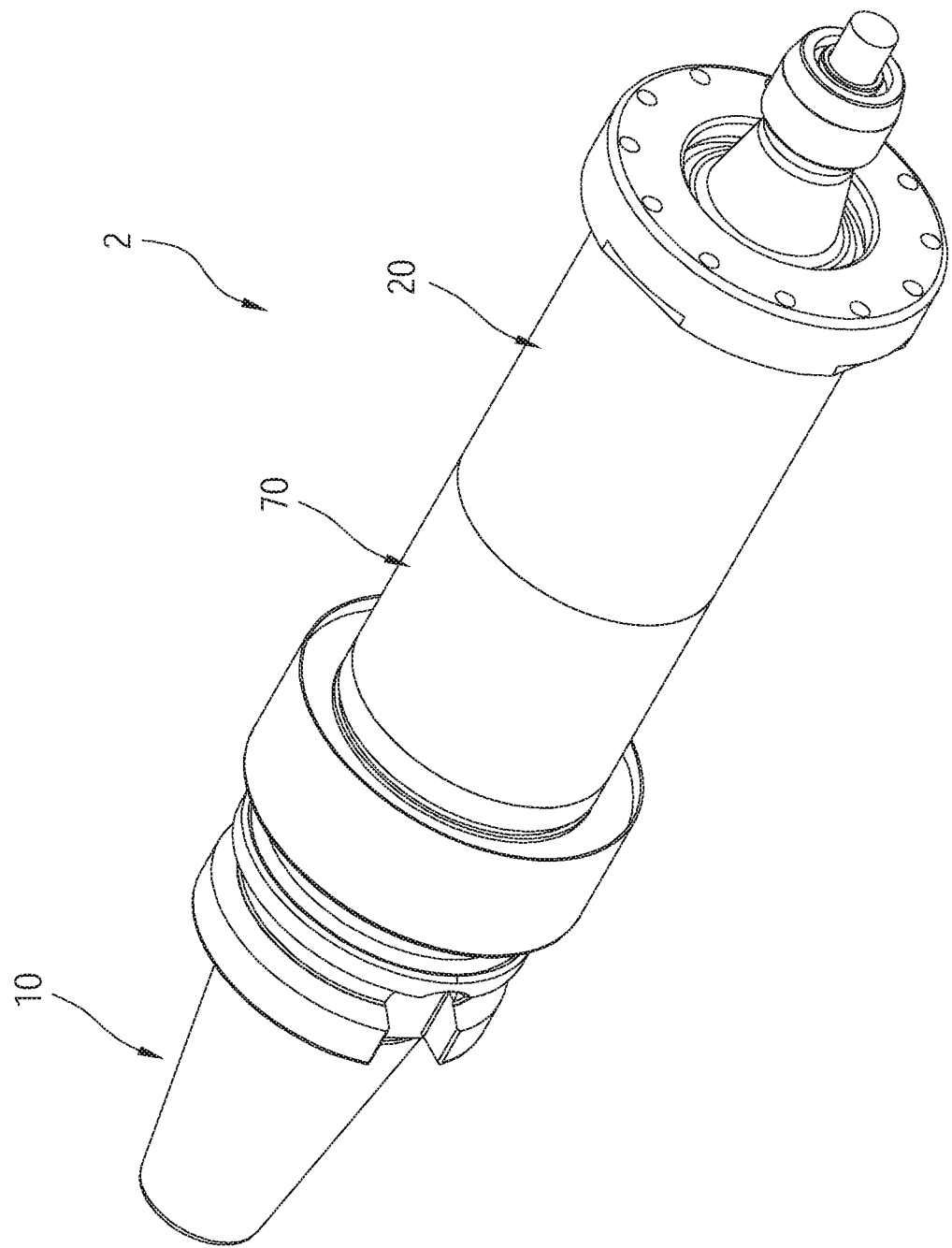
FIG. 7 is a perspective view of the replaceable tool holder of a second embodiment of the present invention.

As shown in FIG. 5 and FIG. 6, the connector 10 has at least one connector passage provided therein, wherein said connector passage includes a central passage 10a and two wire passages 10b, 10c. The wire passages 10b, 10c extend to the end surface of the first column 14, and form openings on the end surface. At the opening of each of the wire passages 10b, 10c, a first conductive portion 60, 61 is respectively provided as shown in FIG. 2 and FIG. 6. Preferably, each of said two first conductive portions 60, 61 has a different distance from an axis of the replaceable tool holder 1. In other words, the first conductive portions 60, 61 are located on concentric circumferences of different radii. In the current embodiment, said first conductive portions 60, 61 are conductive protrusions. At least one connector wire is disposed in the at least one connector passage. In another embodiment, the number of said connector wires is at least two. In the current exemplified embodiment, there are two connector wires 62, 63, which can be provided in the central passage 10a or in the wire passages 10b, 10c. However, in the current embodiment, the connector wires 62, 63 are disposed in the wire passages 10b, 10c, each of which has an end electrically connected to the power transmission device 50, and another end electrically connected to one of the first conductive portions 60, 61, respectively.

As shown in FIG. 2 to FIG. 4, said tool chuck 20 has a first groove 22, which has a second engaging segment 22a provided on an inner surface thereof. The second engaging segment 22a is adapted to be detachably engaged with the first engaging segment 14a. In the current embodiment, said second engaging segment 22a is, but not limited to be, a threaded segment, which can be engaged with the first engaging segment 14a, which is a corresponding threaded segment as well. The tool chuck 20 has at least one first passage provided therein, as shown in FIG. 5 and FIG. 6. In the current embodiment, there are three first passages 20a, 20b, and 20c, wherein the first passage 20a is located in middle, and is adapted to communicate with the central passage 10a of the connector 10. The other two first passages 20b, 20c flank the first passage 20a, and form two openings on a bottom of the first groove 22. At each of the two openings, a second conductive portion 64, 65 is respectively provided. Preferably, each of the second conductive portions 64, 65 has a different distance from the axis of the replaceable tool holder 1. Furthermore, in the current embodiment, said second conductive portions 64, 65 are conductive rings disposed in two receiving grooves 22b recessed into the bottom of the first groove 22, as shown in FIG. 4. At least one first wire is provided in the at least one first passage. In another embodiment, the number of said first wire is at least two. In the current embodiment, there are two first wires 66, 67 as an example, wherein the first wires 66, 67 could be both disposed in the center first passage 20a, or respectively disposed in the flanking first passages 20b, 20c, which is the case in the current embodiment. Each of the first wires 66, 67 is respectively electrically connected to one of the second conductive portions 64, 65 with an end thereof, and is electrically connected to the electronic component 30 with another end thereof, whereby the electronic component 30 could be provided with electric power. In the current embodiment, said first wires 66, 67 are respectively electrically connected to the electrode sheets 34, as shown in FIG. 5. In addition, as illustrated in FIG. 2 and FIG. 6, said tool chuck 20 further has a second groove 24, which is recessed into the bottom of the first groove 22 and has the first passage 20a.

In addition, in the current embodiment, said tool chuck 20 further includes a main body 26, an end fixer 27, and a horn 28, as shown in FIG. 3 and FIG. 4. The main body 26 has the chamber 201, the end fixer 27 is engaged with a rear end of the main body 26, and the horn 28 is disposed in the chamber 201 (see FIG. 5). The horn 28 has the electronic component 30 provided thereon, and has an engaging end 28a sticking out from the chamber 201, wherein the engaging end 28a is adapted to engage the tool 40. In the current embodiment, the engaging end 28a of said horn 28 is provided with a collet 28b and a collet nut 28c, whereby said tool 40 can be engaged onto the horn 28 through the collet 28b and the collet nut 28c.

Please refer to FIG. 1 to FIG. 6. The situation to engage the connector 10 and the tool chuck 20 is illustrated in FIG. 2, where the first column 14 of the connector 10 is inserted into the first groove 22 of the tool chuck 20, and the second column 16 enters the second groove 24. Furthermore, the first engaging segment 14a on the first column 14 engages with the second engaging segment 22a of the first groove 22. Once engaged, a first abutting surface 11a of the connector 10 corresponds to a third abutting surface 21a of the tool chuck 20, as shown in FIG. 5, to restrict the location of the tool chuck 20 relative to the connector 10 in an axial direction. A second abutting surface 11b of the connector 10 corresponds to a fourth abutting surface 21b of the tool chuck 20 to restrict the location of the tool chuck 20 relative to the connector 10 in a radial direction. Furthermore, after the engagement, the first conductive portions 60, 61 are respectively electrically connected to the second conductive portions 64, 65, as shown in FIG. 2 and FIG. 6, so that the electronic component 30 could obtain electric power from the power transmission device 50. In the current embodiment, the electronic component which is a vibration generator as an example could utilize the electric power to vibrate the tool 40.

The above-described design has the advantage that the engaging interface between the connector 10 and the tool chuck 20 could be modularized, and therefore one single connector 10 could match various kinds of tool chucks 20, or the other way around, one single tool chuck 20 could match various kinds of connectors 10. Furthermore, with the power transmission device 50 which is provided at the connector 10 and the passages, wires, and conductive segments of the connector 10 and the tool chuck 20, the electronic component 30 could be continuously provided with stable electric power to keep its operation.

Figure 8:
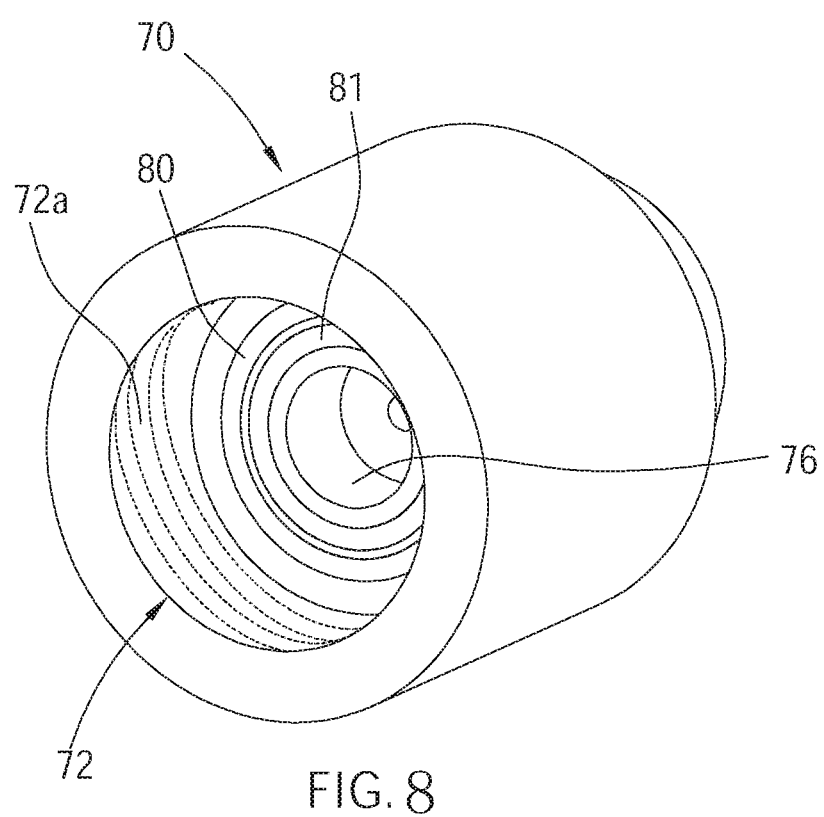
FIG. 8 and FIG. 9 are perspective views of the extension rod of the second embodiment viewed from different angles.
Figure 9:
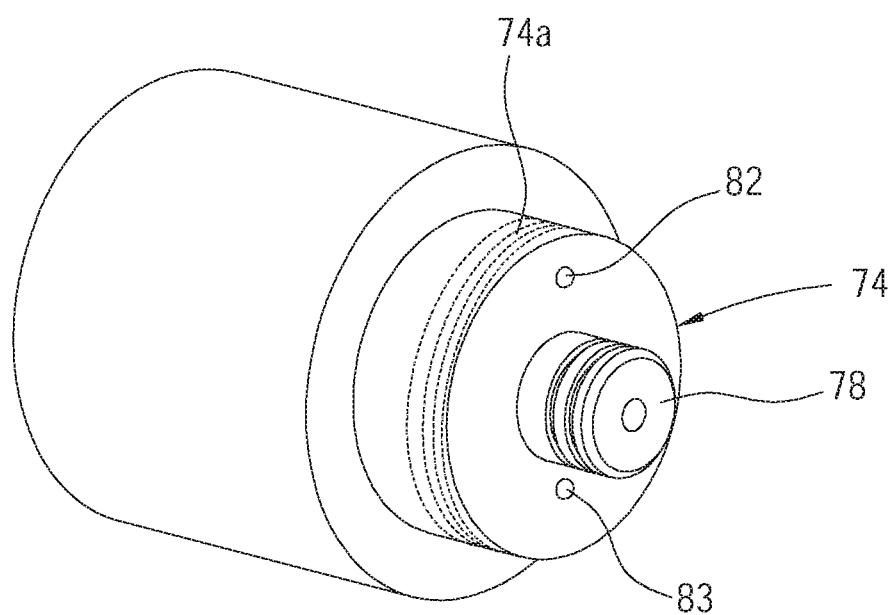

A replaceable tool holder 2 of a second embodiment of the present invention is illustrated in FIG. 7 to FIG. 11, which has roughly the same structures with the replaceable tool holder 1 of the first embodiment. Specifically, the replaceable tool holder 2 also has a connector 10, a tool chuck 20, and an electronic component 30. What is special with the replaceable tool holder 2 is that it further includes an extension rod 70. The extension rod 70 could be disposed between the connector 10 and the tool chuck 20. An end of the extension rod 70 is detachably engaged with the connector 10, while another end thereof is detachably engaged with the tool chuck 20, so that the tool chuck 20 can be engaged with the connector 10 through the extension rod 70. As shown in FIG. 8, the end of the extension rod 70 is provided with a third groove 72, and the third groove 72 has a third engaging segment 72a provided on an inner surface thereof, wherein the third engaging segment 72a is adapted to be engaged with the first engaging segment 14a shown in FIG. 2. As illustrated in FIG. 9, the another end of the extension rod 70 is provided with a third column 74, which has a fourth engaging segment 74a. The fourth engaging segment 74a is adapted to be engaged with the second engaging segment 22a shown in FIG. 2. Said third engaging segment 72a and fourth engaging segment 74a are, but not limited to, threaded segments.

Figure 11:
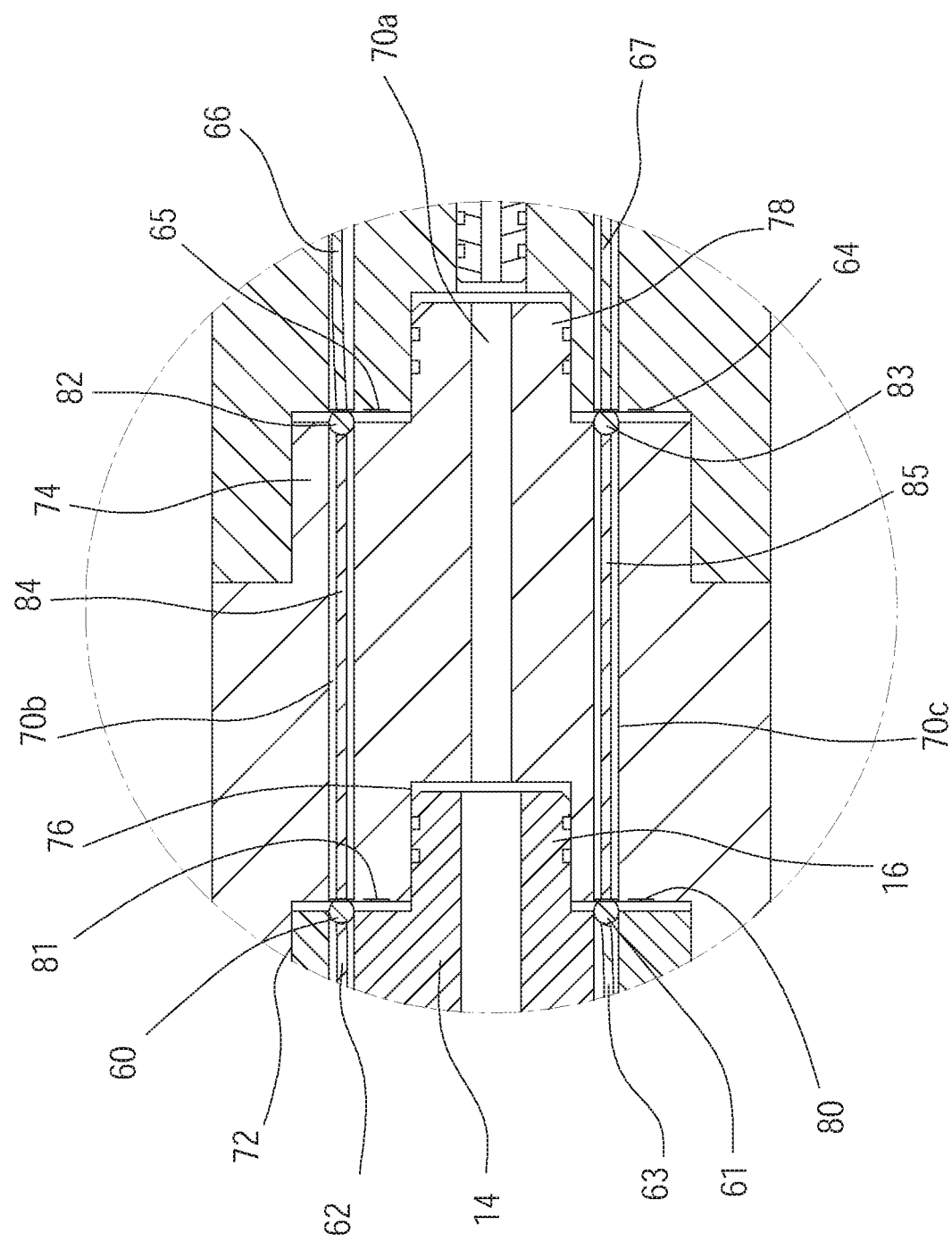

The extension rod 70 has at least one second passage provided therein. In the current embodiment, there are three second passages 70a, 70b, and 70c, as shown in FIG. 11. The second passage 70a is in the middle, and is adapted to communicate with the central passage 10a of the connector 10. The other two second passages 70b, 70c flank the second passage 70a, and respectively form openings on a groove surface of the third groove 72 shown in FIG. 8 and an end surface of the third column 74 shown in FIG. 9. At the openings on the groove surface of the third groove 72, there are two third conductive portions 80, 81 respectively provided, wherein each of the third conductive portions 80, 81 has a different distance from an axis of the replaceable tool holder. At the two openings on the end surface of the third column 74, there are two fourth conductive portions 82, 83 respectively provided, wherein each of the fourth conductive portions 82, 83 has a different distance from the axis of the replaceable tool holder. In the current embodiment, the structures of the third conductive portions 80, 81 are the same with those of the second conductive portions 64, 65 shown in FIG. 2, and the structures of said fourth conductive portions 82, 83 are the same with those of the first conductive portions 60, 61 shown in FIG. 2. At least one second wire is provided in the at least one second passage. In another embodiment, the number of said second wires is at least two, as shown in FIG. 11. In the exemplified current embodiment, there are two second wires 84, 85, wherein the second wires 84, 85 are respectively provided in the second passages 70b, 70c. Furthermore, each of the second wires 84, 85 is electrically connected to one of third conductive portions 80, 81 with an end thereof, and is electrically connected to one of the fourth conductive portions 82, 83 with another end thereof.

Figure 10:
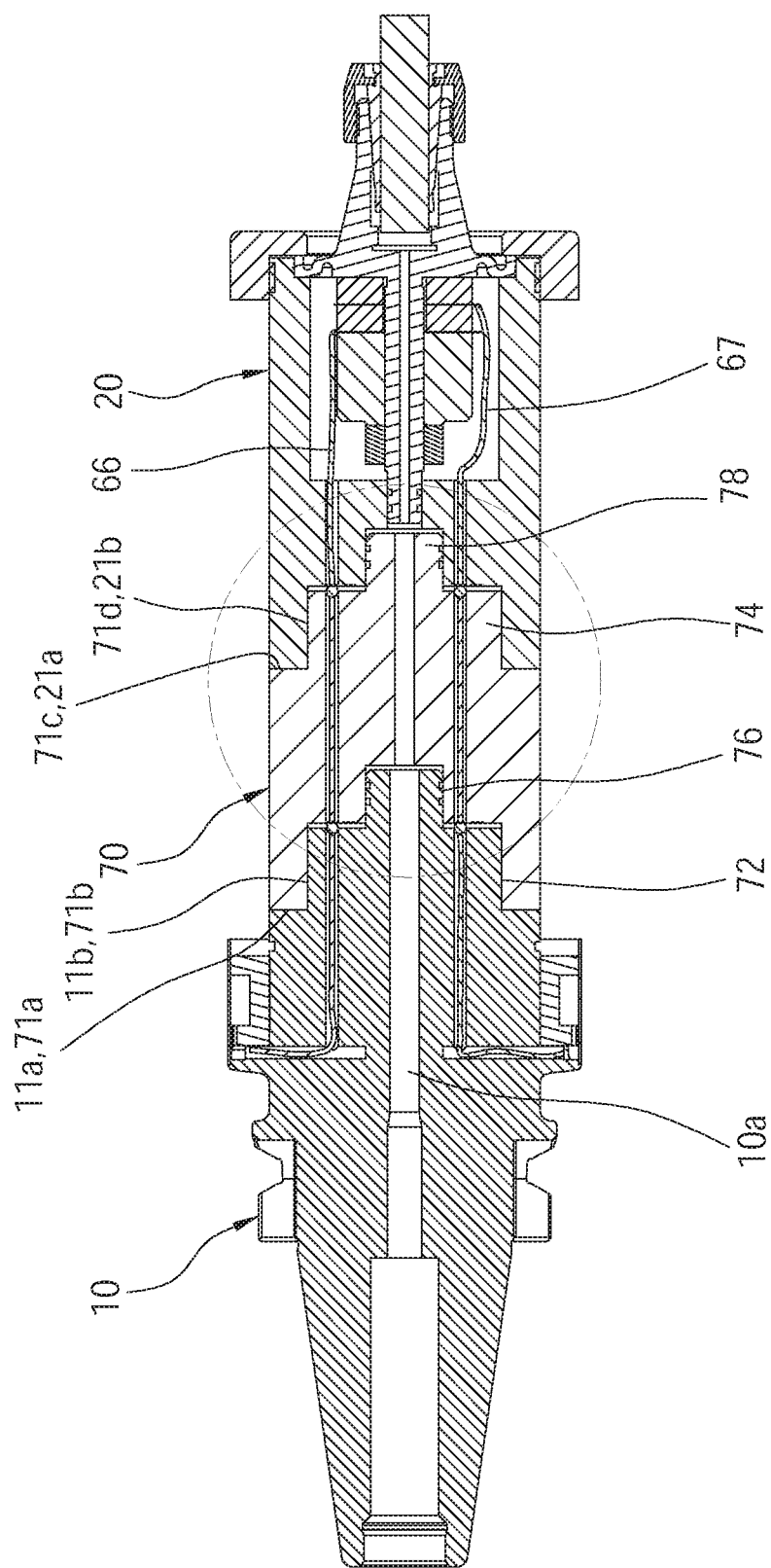
FIG. 10 and FIG. 11 are sectional views of the replaceable tool holder of the second embodiment.

In addition, as shown in FIG. 10, the structure of a side of the extension rod 70 toward the connector 10 could be designed as the same as the structure of the side of the tool chuck 20 toward the connector 10. In other words, the extension rod 70 further includes a fourth groove 76, which is recessed into a bottom of the third groove 72. Furthermore, the fourth groove 76 has the second passage 70a, and the fourth groove 76 is adapted to be inserted by the second column 16 of the connector 10 shown in FIG. 2. The structure of a side of the extension rod 70 toward the tool chuck 20 could be designed as the same as the side of the connector 10 toward the tool chuck 20. In other words, the extension rod 70 further includes a fourth column 78, which protrudes from the end surface of the third column 74, and is adapted to enter the second groove 24 of the tool chuck 20 shown in FIG. 2.

With the above-described design of the current embodiment, the connector 10 could be directly engaged with the tool chuck 20, or, alternatively, could be engaged with the extension rod 70 first, and then get engaged with the tool chuck 20 through the extension rod 70, as shown in FIG. 10. The extension rod 70 has two abutting surfaces 71a,71b respectively abutting against the first abutting surface 11a and the second abutting surface 11b of the connector 10, and two more abutting surfaces 71c,71d respectively abutting against the third abutting surface 21a and the fourth abutting surface 21b of the tool chuck 20. As shown in FIG. 11, once the extension rod 70, the connector 10, and the tool chuck 20 are connected, the first conductive portions 60, 61 of the connector 10 could be electrically connected to the third conductive portions 80, 81, electrically connected to the fourth conductive portions 82, 83 through the second wires 84, 85, and then electrically connected to the second conductive portions 64, 65 and the first wires 66, 67 of the tool chuck 20 through the fourth conductive portions 82, 83. In this way, the electric power from the power transmission device 50 could be transmitted to serve the need of the electronic component 30. Whereby, the total length of a vibrating tool holder could be extended according to different usage or processing requirements. In addition, a user could connect more than one extension rod 70 in series to meet requirements, whereby the total length of the vibrating tool holder could be further lengthened. Besides, in another embodiment, there could be other electronic components such as sensors or strain gauges provided inside said extension rod 70 or on an outer circumferential surface of said extension rod 70, and said other electronic components could be supplied with power through the second wires of the extension rod 70. In this way, when a user requires a specific function like, but not limited to, measuring a rotational speed or a rotational torque, or detecting temperature, he or she could install an extension rod 70 having the electronic component which could provide the required function.

Figure 12:
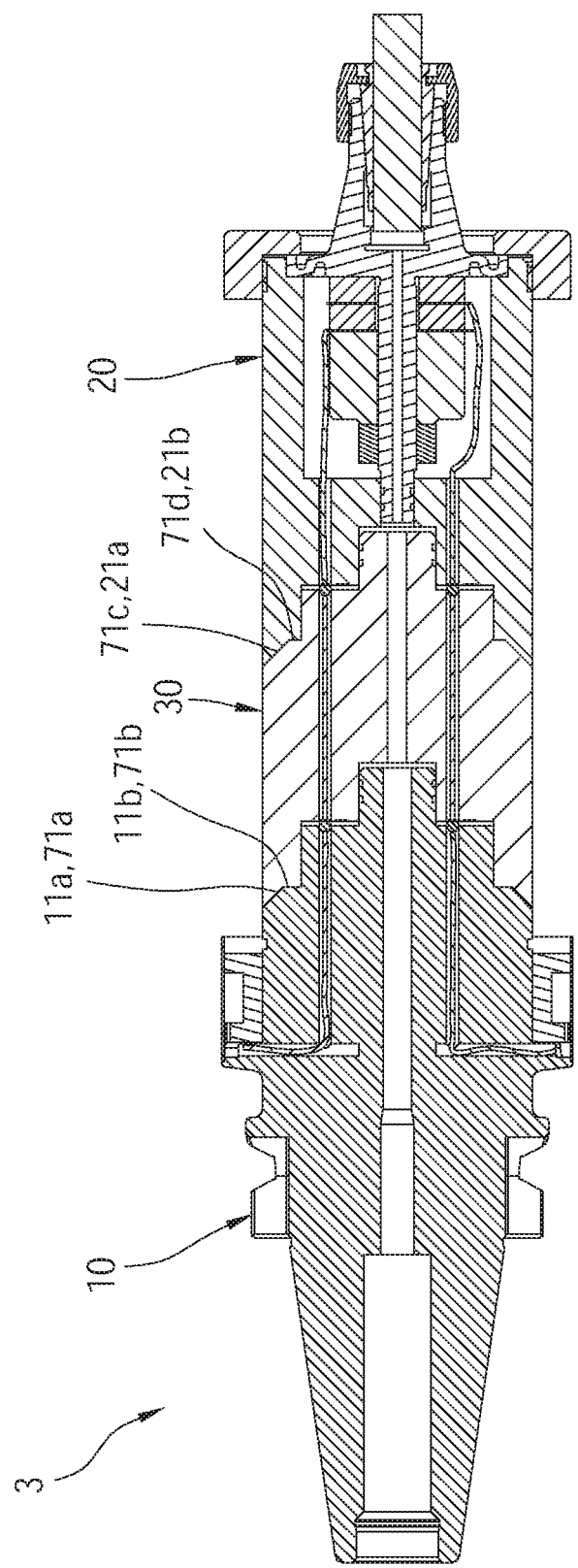
FIG. 12 is a sectional view of the replaceable tool holder of a third embodiment of the present invention.
Figure 13:
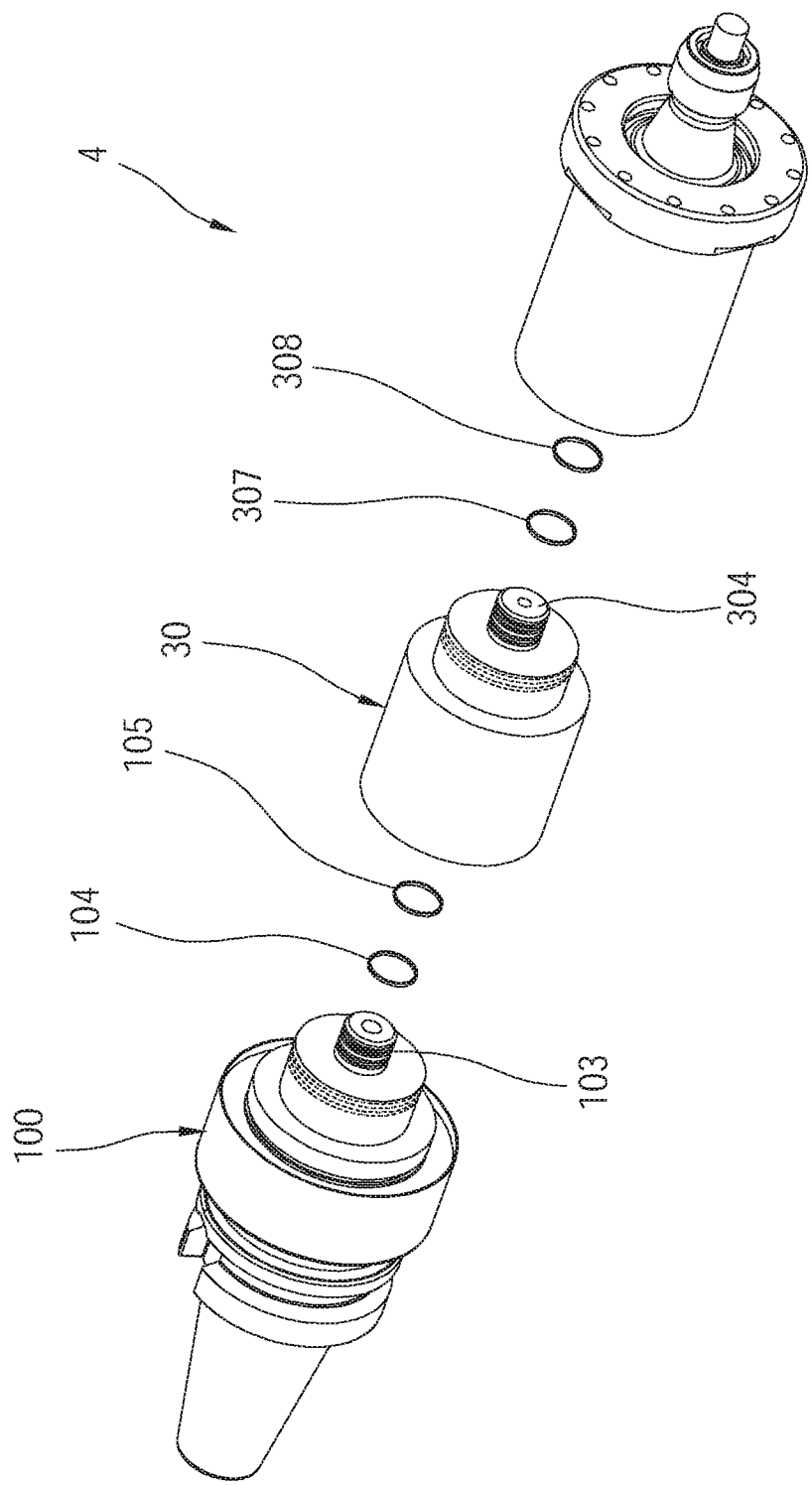
FIG. 13 is a sectional view of the replaceable tool holder of a fourth embodiment of the present invention.

A replaceable tool holder 3 or a third embodiment of the present invention is shown in FIG. 12, which is different from the previous two embodiments by the design that the first abutting surface 11a of the connector 10, the abutting surfaces 71a, 71c of the extension rod 70, and the third abutting surface 21a of the tool chuck 20 are tapered. With such design, the components could be assembled in a more convenient manner.

Figure 14:
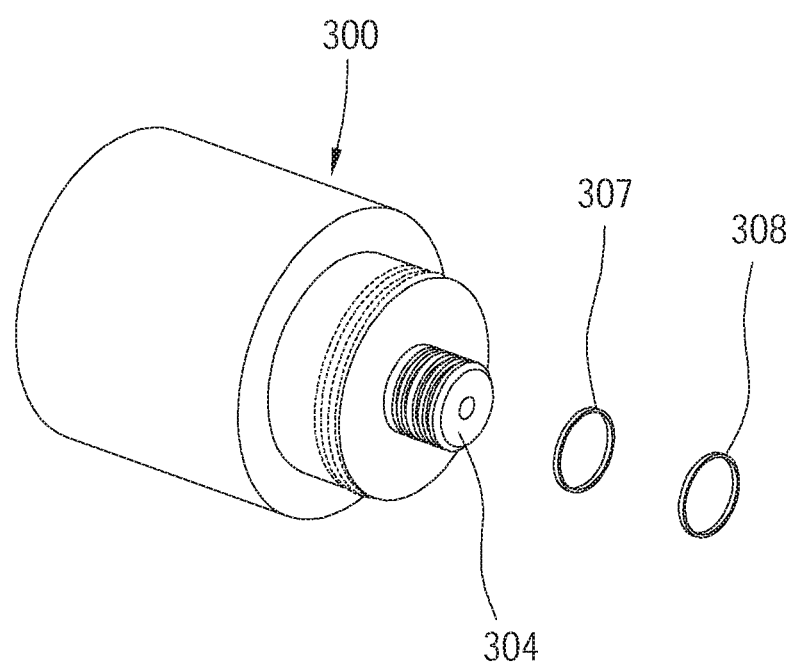
FIG. 14 and FIG. 15 are perspective views of the extension rod of the fourth embodiment viewed from different angles.
Figure 15:
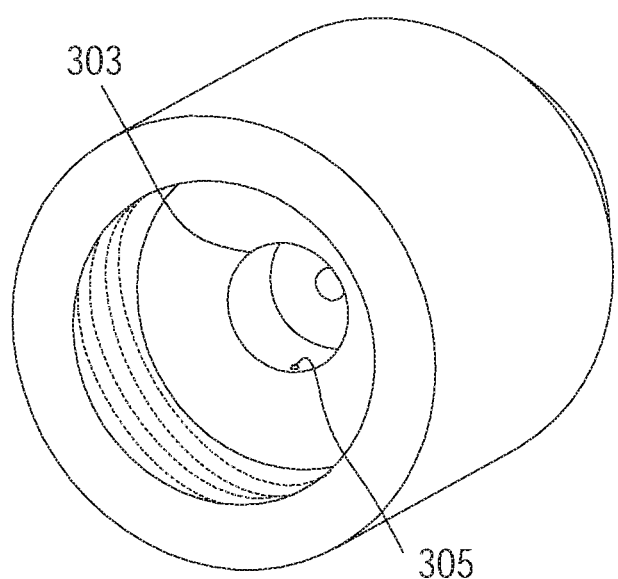
Figure 16:
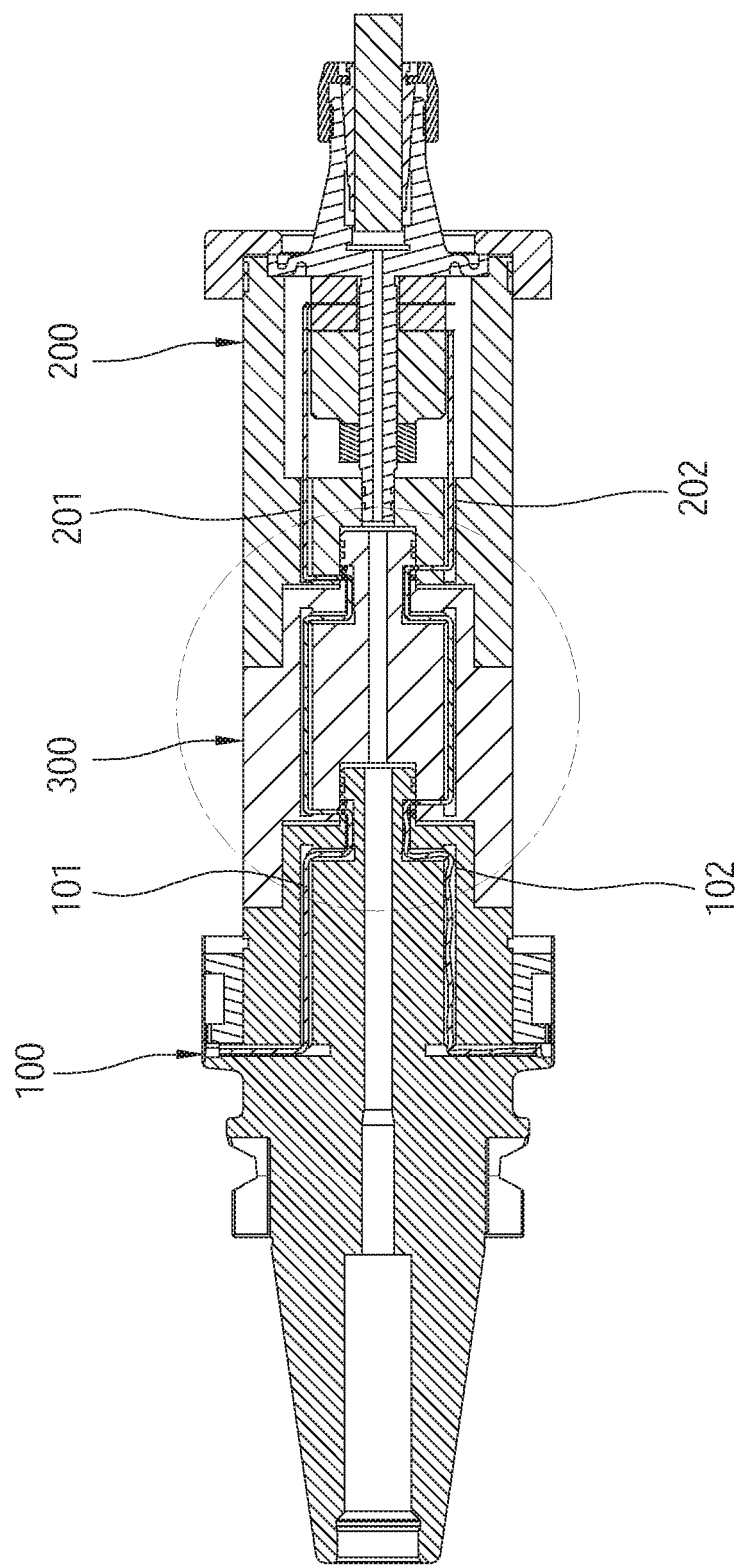
FIG. 16 and FIG. 17 are sectional views of the replaceable tool holder of the fourth embodiment.
Figure 17:
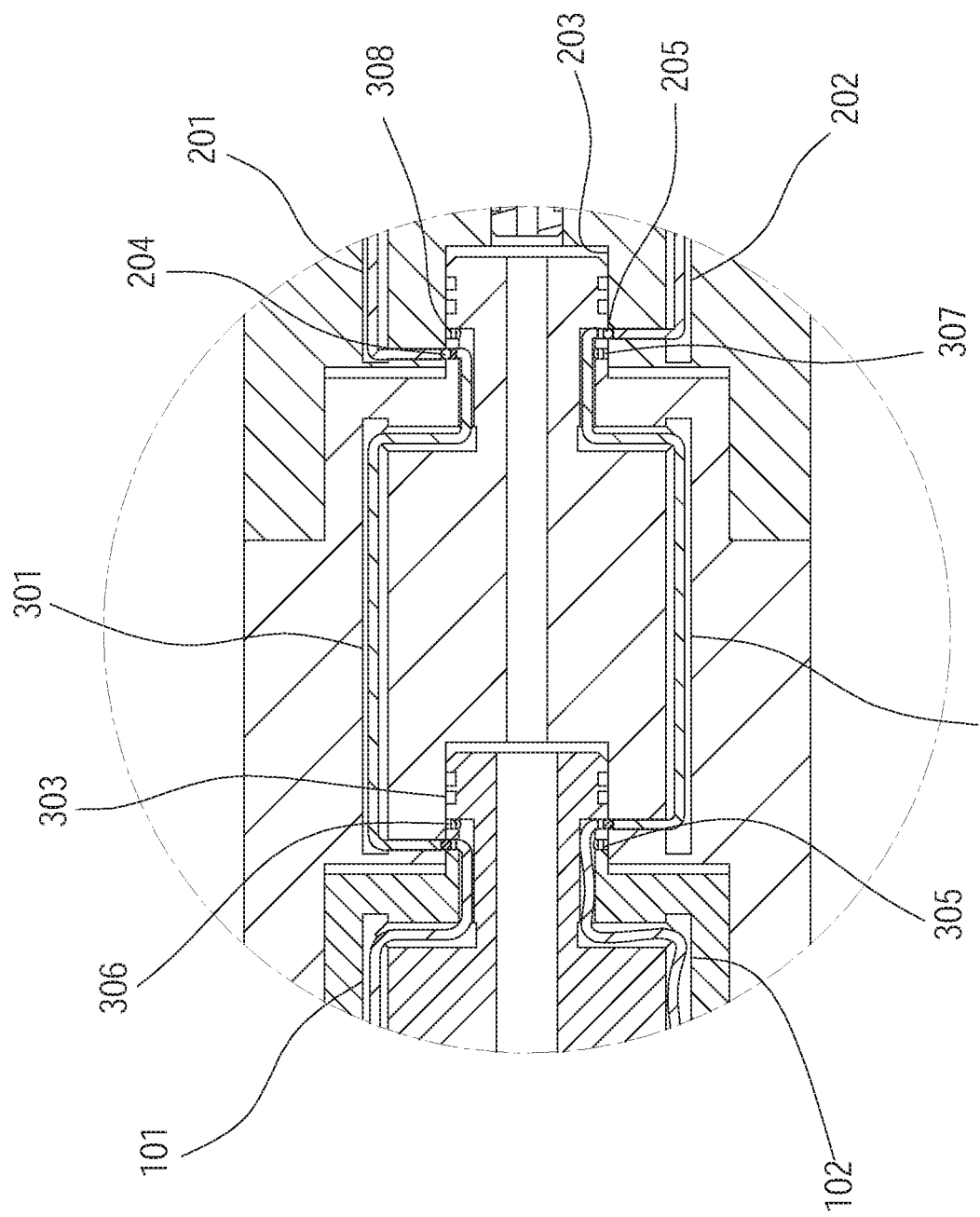

A replaceable tool holder 4 of a fourth embodiment of the present invention is shown in FIG. 13 to FIG. 17, which has roughly the same structures with the replaceable tool holders of the previous embodiments. What's special in the current embodiment is that openings of wire passages 101, 102 of a connector 100 are respectively formed on a second column 103, and first conductive portions 104, 105 fit around an outer circumferential surface of the second column 103, wherein the first conductive portions 104, 105 are spaced in an axial direction. As shown in FIG. 17, openings of first passages 201, 202 of a tool chuck 200 are located on an inner surface of a second groove 203, and second conductive portions 204, 205 are provided on the inner surface of the second groove 203, wherein the second conductive portions 204, 205 are spaced in the axial direction. Second passages 301, 302 of the extension rod 300 form two openings on an inner surface of a fourth groove 303 (FIG. 17), and form two openings on an outer circumferential surface of a fourth column 304 (FIG. 14). As illustrated in FIG. 17, third conductive portions 305, 306 are provided on the inner surface of the fourth groove 303, and are spaced in the axial direction. As shown in FIG. 14, fourth conductive portions 307, 308 are provided on the outer circumferential surface of the fourth column 304, and are spaced in the axial direction. In the current embodiment, two receiving grooves are provided on the outer circumferential surface of the fourth column 304 in the axial direction. Said fourth conductive portions 307, 308 are respectively disposed in the receiving grooves. With the above-described design regarding passages and conductive portions, the effective of transmitting the electric power of the power transmission device to the electronic component could be achieved as well.

Figure 18:
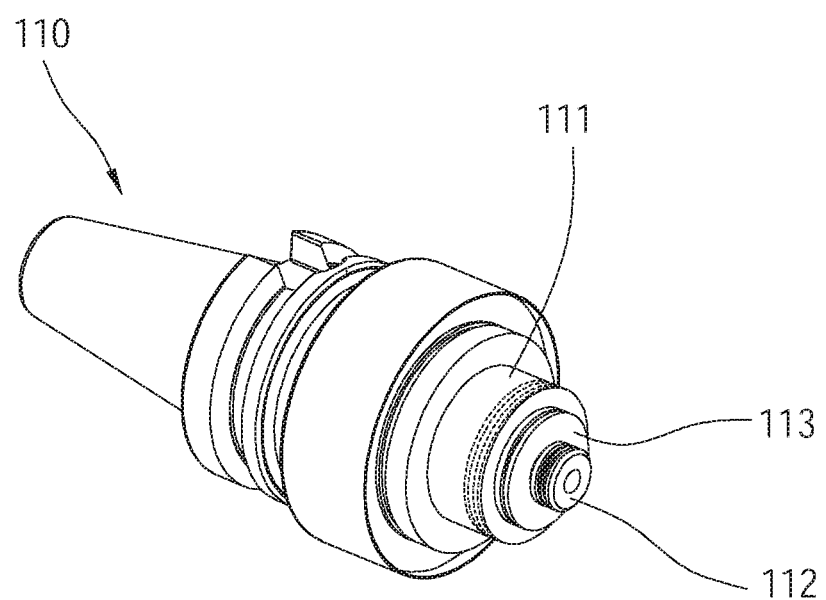
FIG. 18 is a perspective view of the connector implemented in an alternative manner.
Figure 19:
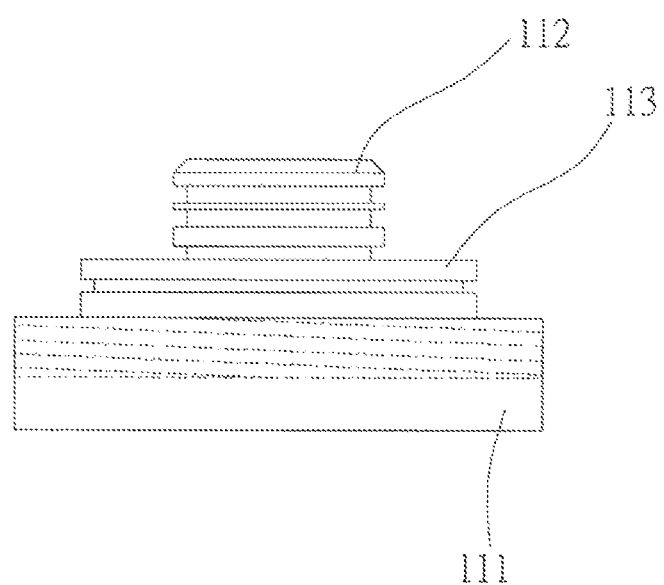
FIG. 19 is an enlarged partial view of the connector viewed from the lateral.

A replaceable tool holder of yet another embodiment is shown in FIG. 18 and FIG. 19, where a connector 110 thereof is roughly the same with the connector 100 of the previous embodiment, except that a second column 112 and a first column 111 of the connector 110 have a shoulder 113 protruding from a conjunction therebetween, and one of first conductive portions could be provided in a recess on an outer circumferential surface of the shoulder 113, while another one of the first conductive portions could be provided in a recess on an outer circumferential surface of the second column 112. Furthermore, a step has to be correspondingly designed between a first groove and a second groove of a tool chuck which is adapted to be engaged with the connector 110, wherein the second conductive portion is provided on the step in order to be electrically connected to the first conductive portion located on the shoulder 113. Or, instead of the aforementioned position, the step could be provided between a third groove and a fourth groove of an extension rod which is adapted to be engaged with the connector 110, and one of the third conductive portions is provided on the step, whereby said third conductive portion could be electrically connected to the first conductive portion located on the shoulder 113.

Figure 20:
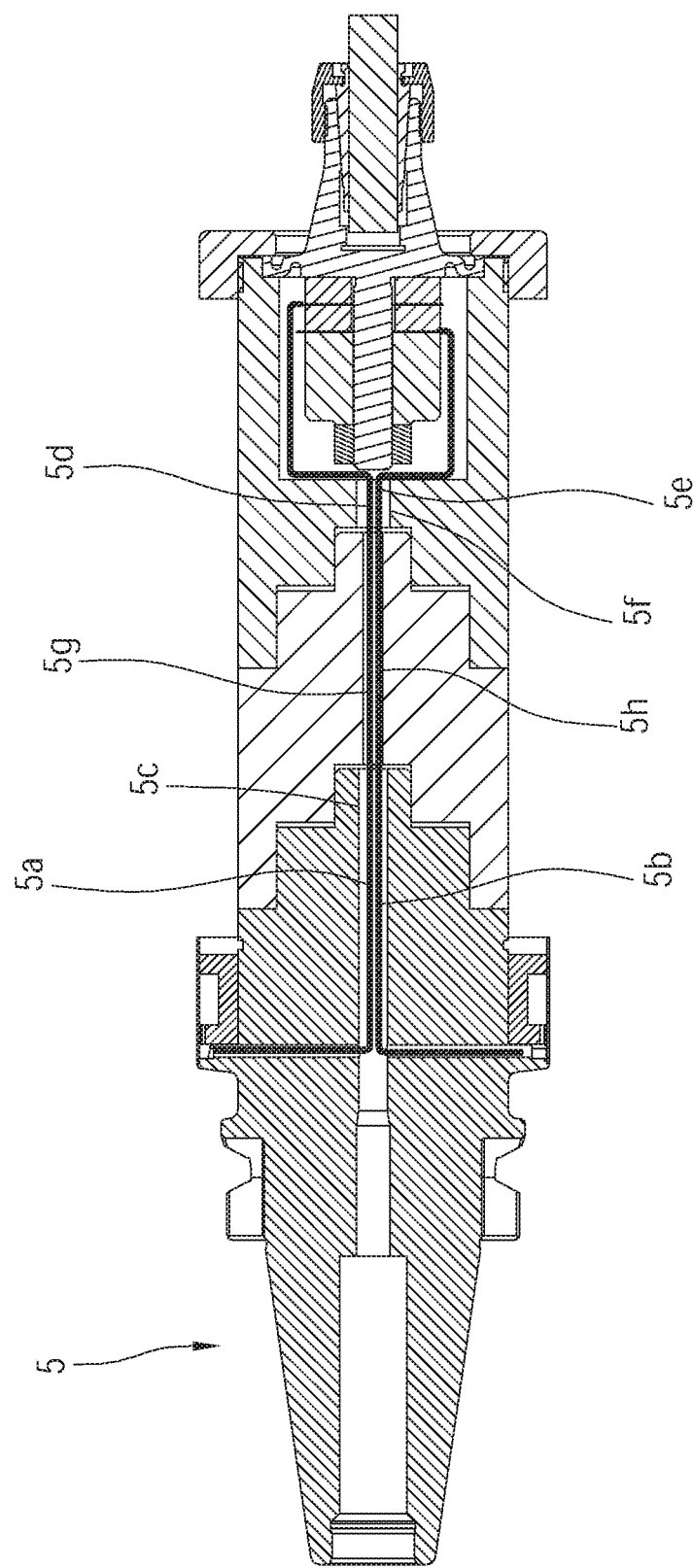
FIG. 20 is a sectional view of the replaceable tool holder of a fifth embodiment of the present invention.

In addition, a replaceable tool holder 5 of a fifth embodiment of the present invention is shown in FIG. 20. In another embodiment, connector wires 5a, 5b could be provided in a central passage 5c of a connector; first wires 5d, 5e could be provided in a first passage 5f, which is located at center, of a tool chuck; second wires 5g, 5h could be provided in a second passage 5i, which is located at center, of an extension rod. In other words, the design described in the previous embodiments that wires pass through passages on sides is not a limitation of the present invention.

In addition, in another embodiment, first to fourth engaging segments are not limited to be threaded segments mentioned in the previous embodiments, and could be mortise-and-tenon or slot-and-block which could mutually match and fix.

The replaceable tool holder provided in the present invention separate the tool holder into at least two main parts, including the spindle holder and the tool chuck, and the engaging structure between the spindle holder and the tool chuck could be modularized. Therefore, one spindle holder could match different kinds of tool chucks, or the other way around, one tool chuck could match various kinds of spindle holders. As a result, the versatility and replaceability of a tool holder could be improved. Also, the spindle holder is provided with the power transmission device. Preferably, the power transmission device has wireless power transmission technology, and could keep supplying power to serve the need of the electronic component on the tool chuck. By using different kinds of electronic components, the tool holder could provide functions of ultrasonic vibration, rotation detection, temperature detection, etc., whereby to realize the implementation of the field of smart machine tools.

In another embodiment, the structure of the conductive protrusions are not limited to the design described above, and could be implemented in the form of pogo pins, which is, again, not a limitation of the present invention. Other structures with the function of transmitting electric power would be also applicable.

In another embodiment, there could be only one connector wire, one first wire, and one second wire. In such a situation, the number of each of the first to the fourth conductive portions could be also only one to correspond to the wires.

In addition, in the above embodiments, the side of said connector and said extension rod toward the tool chuck is a column structure, while the side of said tool chuck and said extension rod toward the connector is a corresponding groove structure. However, these structures are not limitations of the present invention, and could be also designed the other way around. In other words, the side of the connector and the extension rod toward the tool chuck could be a groove structure instead, and the side of the tool chuck and extension rod toward the connector could be a column structure that corresponds to the groove structure.

It must be pointed out that the embodiments described above are only some preferred embodiments of the present invention. All equivalent structures which employ the concepts disclosed in this specification and the appended claims should fall within the scope of the present invention.

What is claimed is:

1. A replaceable tool holder comprising:
   a connector, which is adapted to be engaged with a spindle, and is drivable to rotate by the spindle, wherein the connector is provided with a first sensing module, which is adapted to receive electric power from an externally provided second sensing module in a wireless manner; the connector has at least a connector passage provided therein, and the at least one connector passage has at least one connector wire provided therein; an end of the at least one connector wire is electrically connected to the first sensing module, whereby to receive electric power from the first sensing module, while another end thereof is electrically connected to a first conductive portion;
   a tool chuck, of which an end is detachably engaged with the connector, and another end is adapted to engage a tool, wherein the tool chuck has a chamber and at least one first passage provided therein; the at least one first passage communicates the chamber, and the at least one first passage has at least one first wire provided therein; an end of the at least one first wire is electrically connected to a second conductive portion, which is adapted to electrically connect the first conductive portion; and
   an electronic component provided in the chamber, wherein the electronic component is electrically connected to the at least one first wire;
   wherein in a radial direction of the replaceable tool holder, the second sensing module is outside the first sensing module;
   wherein the connector has a first abutting surface and a second abutting surface; the tool chuck has a third abutting surface and a fourth abutting surface; the third abutting surface matches the first abutting surface to restrict a position of the tool chuck relative to the connector in an axial direction; the fourth abutting surface matches the second abutting surface to restrict a position of the tool chuck relative to the connector in the radial direction; the first conductive portion of the connector is located within the first abutting surface and the second abutting surface in the radial direction; the second conductive portion is located within the third abutting surface and the fourth abutting surface.

2. The replaceable tool holder of claim 1, wherein the tool chuck comprises a main body and a horn; the main body has the chamber; the horn is provided in the chamber, and the horn has an engaging end sticking out from the chamber; the engaging end is adapted to engage the tool; the electronic component is provided on the horn.

3. The replaceable tool holder of claim 1, wherein the connector has a first threaded segment, and the tool chuck has a second threaded segment; the second threaded segment is adapted to engage with the first threaded segment.

4. The replaceable tool holder of claim 1, wherein the connector has a seat and a first column, and an end of the seat is engaged on the spindle; the first column protrudes from another end of the seat; the first column has a first engaging segment; the tool chuck has a first groove; a second engaging segment is provided on an inner surface of the first groove, wherein the second engaging segment is adapted to be detachably engaged with the first engaging segment.

5. The replaceable tool holder of claim 4, wherein the first conductive portion is provided on the first column; the second conductive portion is provided in the first groove.

6. The replaceable tool holder of claim 5, wherein the connector further comprises at least one more first conductive portion, which is located on an end surface of the first column away from the seat; the tool chuck further comprises at least one more second conductive portion, which is located on a bottom of the first groove; each of the at least two first conductive portions has a different distance from an axis of the replaceable tool holder, and each of the at least two second conductive portions has a different distance from the axis of the replaceable tool holder.

7. The replaceable tool holder of claim 6, wherein the first conductive portions are either conductive protrusions or conductive rings; the second conductive portions are either conductive protrusions or conductive rings, but are not the same with the first conductive portions.

8. The replaceable tool holder of claim 5, wherein the first conductive portion is either a conductive protrusion or a conductive ring; the second conductive portion is also either a conductive protrusion or a conductive ring, but is not the same with the first conductive portion.

9. The replaceable tool holder of claim 1, wherein the connector has a seat, a first column, a second column, and another first conductive portion; an end of the seat is engaged on the spindle; the first column protrudes from another end of the seat, and is located between the seat and the second column; the first column has a first engaging segment; the two first conductive portions are provided on an outer circumferential surface of the second column in a manner that they are spaced along the axis; the tool chuck has a first groove and a second groove which communicate with each other, and the tool chuck further has another second conductive portion; the first groove is recessed into a side of the tool chuck, the first groove has a second engaging segment on an inner surface thereof; the second engaging segment and the first engaging segment are detachably engaged; the second groove is recessed into a bottom of the first groove, the two second conductive portions are provided on an inner surface of the second groove in a manner that they are spaced along the axis.

10. The replaceable tool holder of claim 9, wherein the second column has a shoulder protruding from a conjunction between the first column and the second column in a radial direction; one of the first conductive portions is provided on an outer circumferential surface of the shoulder.

11. The replaceable tool holder of claim 1, further comprising an extension rod, wherein an end of the extension rod is adapted to be detachably engaged with the connector, and another end thereof is adapted to be detachably engaged with the tool chuck, whereby to engage the tool chuck and the connector through the extension rod.

12. The replaceable tool holder of claim 11, wherein the connector has a seat and a first column; an end of the seat is engaged on the spindle; the first column protrudes from another end of the seat; the first column has a first engaging segment; the tool chuck has a first groove; the first groove has a second engaging segment provided on an inner surface thereof; the extension rod has a third groove provided at an end thereof, and the third groove has a third engaging segment provided on an inner surface thereof; the third engaging segment is adapted to be engaged with the first engaging segment; the extension rod has a third column provided on another end thereof, wherein the third column has a fourth engaging segment, which is adapted to be engaged with the second engaging segment; the extension rod has at least one second passage provided therein; the at least one second passage has at least one second wire provided therein; an end of the at least one second wire is electrically connected to a third conductive portion, whereby to be electrically connected to the first conductive portion; another end of the at least one second wire is electrically connected to a fourth conductive portion, whereby to be electrically connected to the second conductive portion.

13. The replaceable tool holder of claim 12, wherein the first conductive portion is provided on the first column; the second conductive portion is provided in the first groove; the third conductive portion is located in the third groove; the fourth conductive portion is located on the third column.

14. The replaceable tool holder of claim 13, wherein the connector further has another first conductive portion, and the first conductive portions are located on an end surface of the first column away from the seat; wherein each of the first conductive portions has a different distance from an axis of the replaceable tool holder; the tool chuck further has at least one more second conductive portion, and the at least two second conductive portions are located on a bottom of the first groove; each of the second conductive portions has a different distance from the axis of the replaceable tool holder; the extension rod further has at least one more third conductive portion, and the at least two third conductive portions are located on a bottom of the third groove; each of the third conductive portions has a different distance from the axis of the replaceable tool holder; the extension rod also further has at least one more fourth conductive portion, and the at least two fourth conductive portions are located on an end surface of the third column away from the connector; each of the fourth conductive portions has a different distance from the axis of the replaceable tool holder.

* * * * *